United States Patent
Roming et al.

(10) Patent No.: US 7,963,483 B2
(45) Date of Patent: Jun. 21, 2011

(54) STIFFENING ELEMENT CARBON-GLASS LAYERED FOOT SECTION

(75) Inventors: Thorsten Roming, Himmelpforten (DE); Thorsten Schroeer, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 428 days.

(21) Appl. No.: 11/981,432

(22) Filed: Oct. 31, 2007

(65) Prior Publication Data

US 2008/0179461 A1 Jul. 31, 2008

Related U.S. Application Data

(60) Provisional application No. 60/855,633, filed on Oct. 31, 2006.

(51) Int. Cl.
*B64C 1/06* (2006.01)

(52) U.S. Cl. .......... 244/133; 244/119; 244/131; 52/847

(58) Field of Classification Search .................. 244/119, 244/131–133, 158.1
See application file for complete search history.

(56) References Cited

U.S. PATENT DOCUMENTS

| 5,242,523 | A |   | 9/1993 | Willden et al. |        |
|-----------|---|---|--------|----------------|--------|
| 5,951,800 | A | * | 9/1999 | Pettit         | 244/133 |
| 6,730,184 | B2| * | 5/2004 | Kondo et al.   | 156/221 |

OTHER PUBLICATIONS

Middleton, Donald H. (Hrsg.): "Composite materials in aircraft structures", Auflage, Harlow: Longman, 1990, pp. 229, 235, ISBN: 0-582-01712-2.
Knauer, Berthold (Hrsg.): "Polymertechnik und Lelchtbau", Auflage Hildburghausen: Verl. Frankenschwelle, 2006, pp. 58-59, ISBN: 3-86180-190-6.

\* cited by examiner

*Primary Examiner* — Eileen Lillis
*Assistant Examiner* — Matthew J Smith
(74) *Attorney, Agent, or Firm* — Greer, Burns & Crain, Ltd.

(57) ABSTRACT

The present invention provides a stiffening element for stiffening a step-like substructure, in particular in an aircraft or spacecraft, having a foot section which is composed of a fiber composite material and is shaped in the form of a step such that it essentially fills the substructure. A method is also provided for production of a stiffening element for stiffening of a step-like substructure in an aircraft or spacecraft, according to which a profile part with a foot section which is composed of a carbon-fiber-reinforced plastic is provided, at least one layer of a glass-fiber-reinforced plastic is laminated onto the foot section, and the glass-fiber-reinforced plastic is milled corresponding to a step-like shape which essentially fills the substructure.

8 Claims, 3 Drawing Sheets

(A)

(B)

STIFFENING ELEMENT CARBON-GLASS LAYERED FOOT SECTION

CROSS-REFERENCE TO RELATED APPLICATIONS

This application claims the benefit of U.S. Provisional Application No. 60/855,633, filed Oct. 31, 2006, the entire disclosure of which is herein incorporated by reference.

FIELD OF THE INVENTION

The present invention relates to a stiffening element for an aircraft or spacecraft, and to a method for production of such a stiffening element for an aircraft or spacecraft.

BACKGROUND OF THE INVENTION

Although applicable to any desired stiffening elements, the present invention as well as the problem on which it is based will be explained in more detail with reference to frames for stiffening a fuselage shell of an aircraft.

Fuselage shells for aircraft are normally produced using a so-called lightweight structure from an outer skin, which is reinforced on the inside by a two-dimensional structure composed of stringers, which run in the longitudinal direction of the aircraft, and frames which run in the lateral direction as stiffening elements. In this case, different profile shapes are known for the stringers and are equivalent, for example, to an "L", an "Ω" or an inverted "T". In this case a part of the profile respectively forms a foot section of the stringer, which rests flat on the inside of the outer skin and is firmly connected to it by various techniques such as riveting, welding or adhesive bonding.

In order to allow frames which run in the lateral direction for further stiffening to be fitted into the substructure which is formed by the connection of the skin and stringers, cutouts are normally provided on the frames at the crossing areas of the frames and stringers, so that the stringers are passed through the cutouts underneath the frames in the stiffening structure which is formed together with the frames. The connection between the frame and the outer skin in the areas between the cutouts is in this case produced either by means of a separate clip, for example a molded sheet-metal part, or, in the case of a so-called integral frame, by a foot section which is integrated in the frame.

In order to achieve good mechanical robustness, it is desirable for the clip or the foot section of the frame to be passed not only over the outer skin itself but also over foot sections of the stringers, for example over a foot section of an Ω-shaped or T-shaped stringer. Since the junction between the outer skin and the foot section of the stringer represents a step, the clip or foot section of the frame must be appropriately matched to the shape of this step, in order to fix the frame both in the area of the foot sections of the stringers and in the area of the outer skin which is exposed between the stringers.

For example, in the case of a clip formed from a molded sheet-metal part it is possible to provide apertures, corresponding to the shape of the step, in the molded sheet-metal part during production, or to introduce these by subsequent shaping. In the case of an integral frame which is manufactured from aluminum or from some other metal, the foot section can be adapted by milling the shape of the step-like substructure.

Fuselage shells, stringers and frames are, however, increasingly produced from fiber composite materials, in particular from carbon-fiber-reinforced plastic (CFRP), for weight-saving reasons. In this case, they have a structure composed of a plurality of layers of fiber mats, which are connected to one another by means of a cured resin matrix, in particular epoxy resin. This results in the problem that step-like milling of a foot section of an integral frame manufactured from CFRP is impossible in the manner described for an aluminum frame, since CFRP is subject to splitting and delamination if milled in a direction at a sharp angle to the fiber profile.

One method that is currently used for CFRP integral frames therefore provides for shims to be inserted between the foot section of the frame and the deeper areas of the step-like substructure in order to compensate for the steps in the substructure. This method has the disadvantage that numerous additional parts which fit accurately must be manufactured with the shims, thus increasing production costs and the total weight of the structure.

A further problem which occurs when using integral frames manufactured from CFRP is that the curing process during the production of the CFRP frames means that it is not possible to achieve the same dimensional accuracy as in the case of milled aluminum frames. Shims are also used for this reason, in the stated manner and with the stated disadvantages.

SUMMARY OF THE INVENTION

One object of the present invention is therefore to provide an improved stiffening element, in particular with the aim of matching a stiffening element, manufactured from a fiber composite material, to a step-like substructure, with low costs.

According to the invention, this object is achieved by a stiffening element having the features of Patent Claim 1, or by a method for production of a stiffening element having the features of Patent Claim 11.

A stiffening element is accordingly provided for stiffening a step-like substructure, in particular in an aircraft or spacecraft. The stiffening element has a foot section composed of a fiber composite material, which is shaped in the form of a step such that it essentially fills the substructure.

Furthermore, a method is provided for production of a stiffening element for stiffening of a step-like substructure for an aircraft or spacecraft. The method steps will be described briefly in the following text. First of all, a profile part with a foot section is provided, composed of a carbon-fiber-reinforced plastic. At least one layer of a glass-fiber-reinforced plastic is then laminated onto the foot section. The glass-fiber-reinforced plastic is then milled corresponding to a step-like shape, which essentially fills the substructure.

The idea on which the present invention is based is that the shape of the foot section of the stiffening element is designed to correspond to the shape of the step-like substructure, so that the foot section is seated with an accurate fit on the substructure, when inserted into the substructure. This means that there is no need to use shims to compensate for steps, thus resulting in a saving in production costs and weight.

Advantageous refinements and improvements of the invention can be found in the dependent claims.

According to one embodiment of the invention, the fiber composite material is composed of a carbon-fiber-reinforced plastic. Carbon-fiber-reinforced plastics are preferable for use in aviation and in space flight, owing to their low weight with high strength. This measure allows the stiffening element to be optimized in terms of strength and weight. In this case, the fiber composite material may have the carbon-fiber-reinforced plastic either in its entirety or else only in a part of the stiffening element. For example, the fiber composite material may have glass-fiber-reinforced plastic in a part of the stiffening element.

According to a further embodiment of the invention, the fiber composite material has fibers which are arranged running along the step-like shape of the foot section. This measure results in a surface with good resistance being produced in a shape which essentially fills the step-like substructure. This means that there is no need either to use shims or to use additional materials, for example glass-fiber-reinforced plastic in addition to carbon-fiber-reinforced plastic, thus leading to a particular saving in weight.

In this case, the foot section preferably has a constant thickness along the step-like shape. This has the additional advantage that the thickness can be chosen as appropriate for the required mechanical robustness, and it is possible to avoid weight-increasing thickened areas.

According to a further embodiment of the invention, the foot section has at least one layer of glass-fiber-reinforced plastic. This is arranged on that side of the foot section which is shaped like a step, such that it essentially fills the substructure. The expression a layer should be understood here as meaning a single fiber mat of glass fibers. A layer composed of glass-fiber-reinforced plastic can also be provided, comprising a plurality of layers of glass fibers. This measure results in the advantage that it is possible to provide a glass-fiber-reinforced plastic with excellent machining characteristics on the surface of the foot section, while a lightweight material such as carbon-fiber-reinforced plastic can be chosen for the majority of the stiffening element.

By way of example, glass-fiber-reinforced plastic has the advantage over carbon-fiber-reinforced plastic that it can be milled to any desired shape. For example, it is possible to machine the foot area by milling of the glass-fiber-reinforced plastic to a more precise dimension than would be possible if a stiffening element were to be produced purely from carbon-reinforced plastic. There is no risk of inadvertent damage to the carbon-reinforced plastic as a result of excessive milling, since the plastics can easily be distinguished by their colour. This measure means that there is no need to manufacture and use shims to compensate for dimensional inaccuracies, thus leading to a further cost reduction. Furthermore the layer of glass-fiber-reinforced plastic avoids splitting adjacent to drilled holes when, for example, holes are drilled in the foot section in order to rivet the foot section to the substructure.

The carbon-fiber-reinforced plastic and the at least one layer of glass-fiber-reinforced plastic preferably have fibers which run parallel to one another. This is achieved, for example, by introducing glass-fiber mat layers into a lamination apparatus, which is used for production of the stiffening element, and by laminating them on. The fibers which run parallel without being damaged on the boundary surface result in a robust connection, which can be manufactured easily.

According to one embodiment of the invention, the at least one layer of glass-fiber-reinforced plastic has a step-like change in thickness along the foot section. This step-like change makes it possible to match the foot section to a corresponding, inversely shaped, step in the substructure to be stiffened so that the foot section makes flat contact with the substructure on both sides of the step, when inserted into the substructure.

Some of the fibers in the at least one layer of the glass-fiber-reinforced plastic are in this case preferably cut off adjacent to the step-like change. Since the step-like change is formed exclusively in the glass-fiber-reinforced plastic, the step-like change can in fact be produced by milling. The milling process can easily be automated, in contrast to the production of the stiffening element by means of lamination. This has the advantage that, for example, it is possible to produce a series of stiffening elements, which are intended to be used with the same basic shape at different points in the aircraft or spacecraft, where differently shaped step-like changes are in each case required adjacent to the foot area owing to the different substructure, from identical semi-finished products, which are produced in the same lamination apparatus, of the stiffening element, simply by reprogramming a numerically controlled milling device.

The at least one layer of the glass-fiber-reinforced plastic preferably has a maximum thickness of 1 to 20 mm. The thickness can in this case be chosen such that it is possible to produce all feasible step-like contours of the substructure by milling the glass-fiber-reinforced plastic, without unnecessarily increasing the weight of the stiffening element.

Furthermore, the at least one layer of the glass-fiber-reinforced plastic preferably has a minimum thickness of 0.1 mm to 0.2 mm along the foot section. This measure results in a residual layer of the glass-fiber-reinforced plastic in all cases, so that the surface is still protected, for example against splitting during drilling, even if the maximum amount is milled away.

According to a further embodiment of the method according to the invention, the at least one layer of the glass-fiber-reinforced plastic is laminated on with a constant thickness along the foot section. In this case in particular, the thickness is between 1 mm and 20 mm. This method is particularly advantageous since, for example for a production batch of stiffening elements, it is possible to laminate on a layer of glass-fiber-reinforced plastic with a constant thickness, even if different detail structures of the foot section are required for different use of the stiffening elements, since these detail structures can be produced by subsequent different milling, for example using different milling programs.

According to a further embodiment of the method according to the invention, the glass-fiber-reinforced plastic is milled to a remaining thickness of 0.1 mm to 0.2 mm. This measure results in there always being a residual layer of the glass-fiber-reinforced plastic, which protects the surface, for example against splitting, when drilling holes for riveting.

BRIEF DESCRIPTION OF THE DRAWINGS

The invention will be explained in more detail in the following text using exemplary embodiments and with reference to the attached figures in the drawing, in which.

In the figures, like reference symbols denote the same or functionally identical components, unless stated to the contrary.

DETAILED DESCRIPTION OF THE INVENTION

Figure 1:
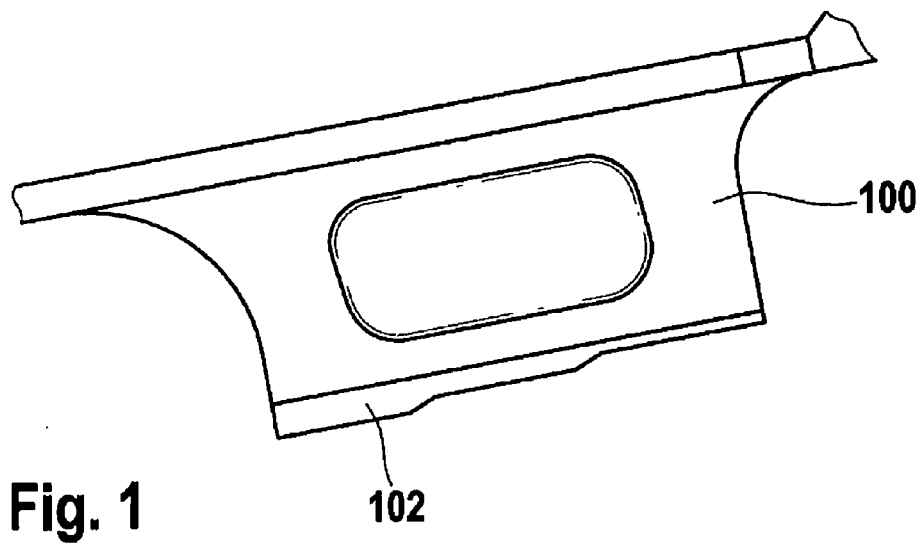
FIG. 1 shows a longitudinal view, in the form of a detail, of a conventional lightweight metal frame.

FIG. 1 shows a detail of a conventional integral frame 100 composed of aluminum or some other lightweight metal. The integral frame 100 has a foot section 102, on which suitable steps for matching to a substructure, which is correspondingly shaped but is not shown, have been formed by milling.

Figure 2:
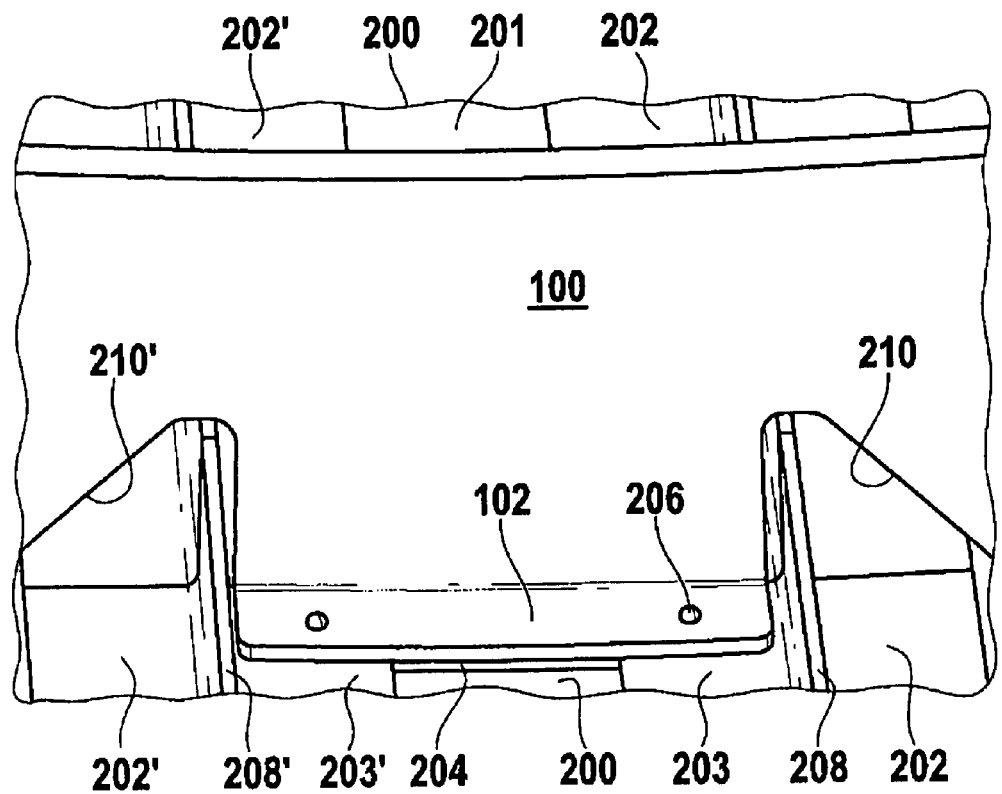
FIG. 2 shows a perspective view of a detail of a conventional stiffening structure with a frame composed of carbon-fiber-reinforced plastic.

FIG. 2 shows a perspective view of a detail of an inner surface 201 of a conventional stiffening structure of a fuselage shell of an aircraft, as is used in particular for manufacture of the outer skin 200, stringers 202, 202' and frames 100 composed of carbon-fiber-reinforced plastic. Stringers 202, 202' are mounted on the inner surface 201, run parallel and stiffen the fuselage shell in the longitudinal direction of the aircraft. The stringers 202, 202' are so-called T-shaped stringers, which have a foot 203, 203' which rests on the inner surface 201 and is connected to it, for example by adhesive bonding, and a web section 208, 208', which extends essentially at right angles to the inner surface 201 of the outer skin 200.

A frame 100 runs in the lateral direction with respect to the stringers 202, 202' and has cutouts 210, 210' through which the stringers 202, 202' are passed under the frame 100. The frame 100 also has a foot section 102, which extends parallel to the outer skin 200 and rests on the feet 203, 203' of the stringers 202, 202'. The frame 100 is attached to the inner surface 201 of the outer skin 200 by means of rivets 206 passing through the stringers 202, 202'.

Since the foot section 102 is shaped to be straight, but there is a height difference between the feet of the stringers 202, 202' and the outer skin 200, corresponding to the thickness of the feet 203, 203' of the stringers 202, 202', the foot section of the frame does not, however, rest on the outer skin 200 in the area between the feet 203, 203' of the stringers 202, 202'.

A shim 204 is inserted between the foot section 102 of the frame 100 and the outer skin 200, in the area between the feet of the stringers 202, 202', is adhesively bonded to the frame 100 and to the outer skin, and therefore indirectly produces the connection between them.

Figure 3:
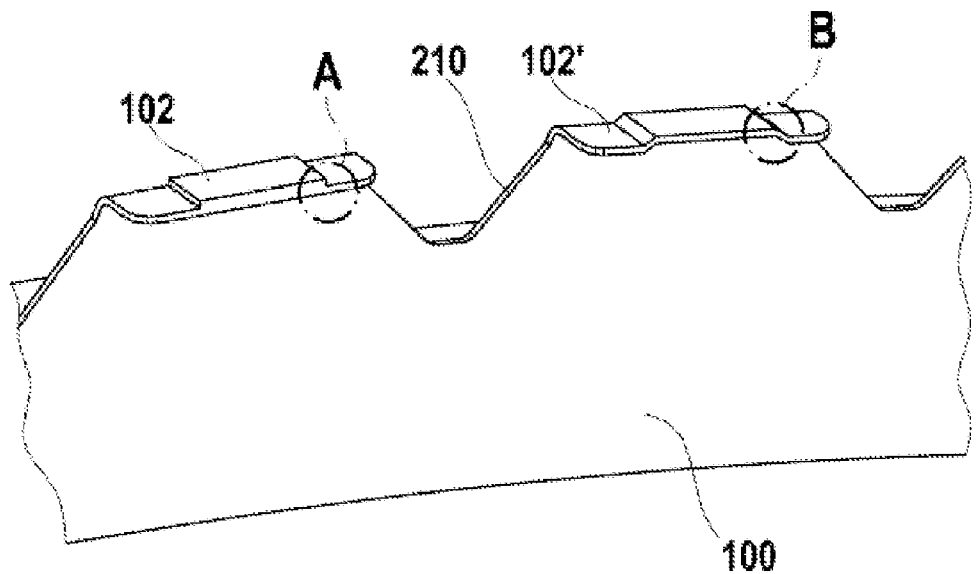
FIG. 3 shows a perspective view of a stiffening element according to one embodiment of the invention.

FIG. 3 shows a perspective view of an integral frame 100, which represents a stiffening element according to one embodiment of the invention. In contrast to the view shown in FIG. 2, the frame 100 is shown in the reversed position, with cutouts 210 and foot sections 102, 102' pointing upwards. In order to illustrate a plurality of possible embodiments of the invention, each of the two illustrated foot sections 102, 102' is designed differently and each in their own right likewise correspond to embodiments of the invention.

Figure 3A:
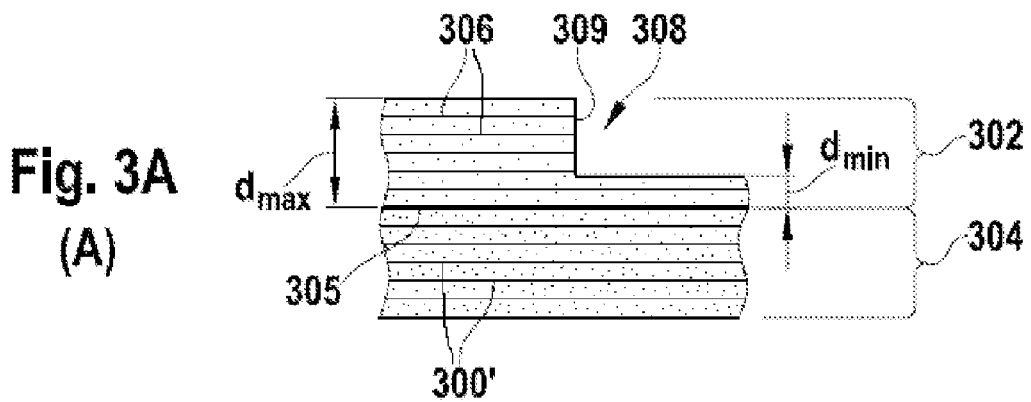
FIG. 3A shows an enlarged longitudinal section view A from FIG. 3.

The embodiment illustrated on a first foot section 102 shows the foot section 102 having a thickness which changes in the form of a step along the profile of the frame 100 in the longitudinal direction, with this thickness being formed by a thickened area in the centre of the foot section 102. In order to explain the construction of the foot section 102 in detail, a detail A is marked in the figure, and is illustrated enlarged in FIG. 3A, in the form of a schematic longitudinal-section view.

The enlarged view of the detail A shows that the foot section 102, as illustrated in FIG. 3, is composed of a lower area 304 composed of carbon-fiber-reinforced plastic, and, as shown in the illustration in FIG. 3, an upper area 302, composed of glass-fiber-reinforced plastic. The area 304 which is composed of carbon-fiber-reinforced plastic is a continuation of the profile part which forms the body of the frame 100. In its own right, this area 304 has a constant thickness and is designed to be in the form of a straight line, for example in the same way as the foot section of a conventional frame as shown in FIG. 2. Fabric layers of carbon fibers 300' run parallel to the boundary surface 305 of the areas 304, 302 within the area 304.

The area 302, which is composed of glass-fiber-reinforced plastic, in contrast has a thickness which changes in the form of a step along the foot section 102, and is between a maximum value $d_{max}$ and a minimum value $d_{min}$. The minimum value $d_{min}$ along the foot section 102 is preferably approximately between 0.1 mm and 0.2 mm, and the maximum value $d_{max}$ along the foot section 102 is preferably approximately between 1 mm and 20 mm. Fabric layers of glass fibers 306 run parallel to the boundary surface 305 of the areas 304, 302 within the area 304. In this case, some of the fibers have been cut off adjacent to a step 308 which is illustrated and has an end surface 309 running at right angles to the boundary surface 305, while other fibers continue along the boundary surface 305. The rectangular change in the thickness in the area 302 which is composed of glass-fiber-reinforced plastic results in the height of the foot area 102 likewise being changed in the form of a step, and essentially filling a corresponding contour of the substructure to be stiffened, provided that the dimensions are chosen appropriately.

Figure 3B:
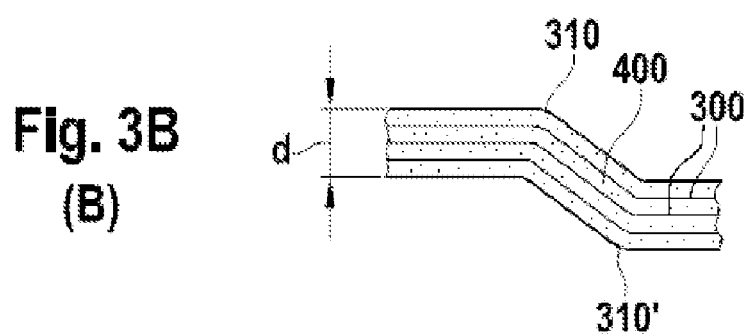
FIG. 3B shows an enlarged longitudinal section view B from FIG. 3.

The embodiment which is illustrated on a second foot section 102' shows the foot section 102 having a constant thickness along the profile of the frame 100, in which an aperture is formed by step-like bends 310, 310', and leads to the foot section 102' being raised like a step in the centre of the foot section 102'. In order to explain the construction of the foot section 102' in detail, a detail B from FIG. 3 is illustrated enlarged in the form of a schematic cross-sectional view, in FIG. 3B.

As can be seen from the enlarged view of the detail B, and in contrast to the foot section 102, the foot section 102' is not divided into areas but, as an entity, represents a continuation of the profile part which forms the body of the frame 100. Fabric layers of carbon fibers 300 run parallel to the surface of the foot section 102' within the foot section 102', also following the profile of the bends 310, 310' and the step-like change in the height of the foot section 102' formed by them. In this case, a diagonal guide 400 for the carbon fibers 300 between the bends 310, 310' makes it possible to avoid the carbon fibers 300 being damaged by excessive bending. This is ensured by the choice of suitable radii. Since the extent of the diagonal guide is short in comparison to the overall length of the foot section 102' this results in essentially the same step-like change in the height of the foot area 102' being achieved as in the foot area 102. Provided that the dimensions are chosen appropriately, this essentially fills a corresponding contour of the substructure to be stiffened, with the achievable contact area being only insignificantly reduced by the diagonal guides that have been mentioned.

Figure 4:
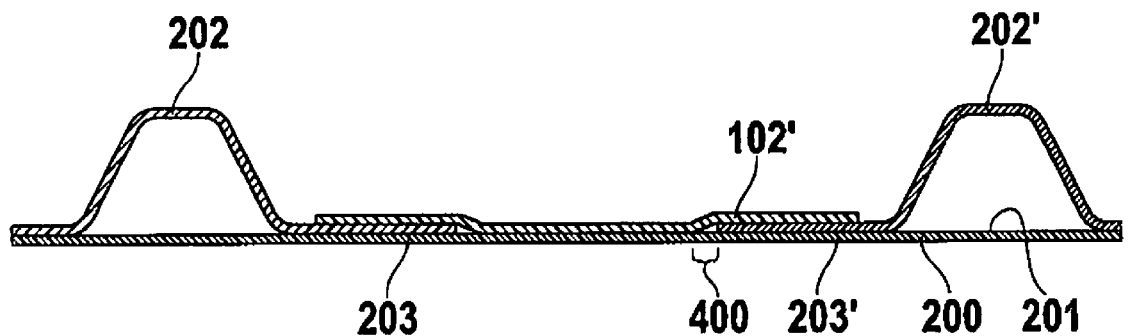
FIG. 4 shows a cross-sectional view of a foot section of a stiffening element according to one embodiment of the invention.

FIG. 4 shows a cross-sectional view of a foot section 102' of a stiffening element according to one embodiment of the invention. Two so-called Ω-shaped stringers 202, 202' are arranged on an inner surface 201 of the outer skin 200, whose profile, which is the same as the letter Ω, is clearly shown in the illustrated cross-sectional view. The foot section 102' of the frame is shown between the feet 203, 203' of the stringers 202, 202', running from one foot 203 of one stringer 202 to the inner surface 201, and onwards to a foot 203' of the other stringer 202'. The foot section 102' is designed corresponding to the embodiment explained at the top on the right in FIG. 3. As can clearly be seen, the diagonal guide 400 mentioned above does not lead to any significant reduction in the contact area between the foot section 102' and the substructure, which is shaped like a step and is composed of stringers and the outer skin.

Figure 5:
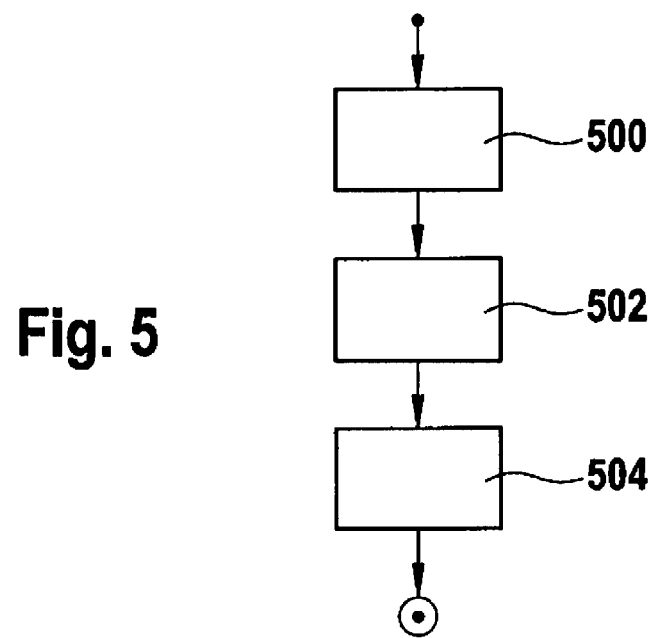
FIG. 5 shows a flowchart of a method for production of a stiffening element, according to one embodiment of the invention.

FIG. 5 shows a flowchart of a method for production of a stiffening element for stiffening a step-like substructure, according to one embodiment of the invention. In a first step 500, a profile part with a foot section is produced, and is composed of a carbon-fiber-reinforced plastic. A profile part here refers to the body of a stiffening element, for example a body, which has been laminated in a lamination apparatus, of an integral frame composed of carbon-fiber-reinforced plastic.

In a second step 502, at least one layer of a glass-fiber-reinforced plastic is laminated onto the foot section. This can be done, for example, using the same lamination apparatus in which the profile part forming the body of the stiffening element has already been laminated.

In a third step 504, the glass-fiber-reinforced plastic is milled away to correspond to a step-like shape which essentially fills the substructure. This can be done, for example, using a numerically controlled milling device, which has been programmed with the step-like shape to be milled.

Although the present invention has been described above with reference to exemplary embodiments, it is not restricted to them, but can be modified in many ways.

By way of example, the geometry of the frames and of the stringers can be modified in many ways. By way of example, it is also possible to use stringers with different profiles, such as L-shaped stringers.

Furthermore, the step-like substructure is not restricted to right-angled steps, but can in general be used for a substructure with complex contours, for example diagonals or curves. The contours of the substructure need not relate to the feet of a stringer, but can be provided in any desired manner.

The expression "stiffening element" refers to stiffening elements of any type, that is to say also to stringers.

What is claimed is:

1. A stiffening element for stiffening a step-like substructure in an aircraft or spacecraft, the stiffening element having a foot section which comprises:
    a carbon-fiber-reinforced plastic material;
    a shape in the form of a step such that it essentially fills the adjacent portion of the substructure; and
    at least one layer of machined glass-fiber-reinforced plastic material bonded on top of the carbon-fiber-reinforced plastic material and configured on that surface of the foot section which matches the shape of the substructure.

2. The stiffening element according to claim 1, further comprising a boundary surface between the carbon-fiber-reinforced plastic and the at least one layer of glass-fiber-reinforced plastic, wherein the carbon-fiber-reinforced plastic comprises carbon fibers running parallel to the boundary surface, and the at least one layer of glass-fiber-reinforced plastic comprises glass fibers running parallel to the boundary surface.

3. The stiffening element according to claim 2, wherein the carbon fibers and the glass fibers run parallel to the boundary surface and to each other.

4. The stiffening element according to claim 1, wherein the at least one layer of glass-fiber-reinforced plastic has a step-like change in thickness along the foot section.

5. The stiffening element according to claim 4, wherein some of the glass fibers in the at least one layer of the glass-fiber-reinforced plastic are cut off adjacent to the step-like change.

6. The stiffening element according to claim 1, wherein the at least one layer of the glass-fiber-reinforced plastic has a maximum thickness of 1 mm to 20 mm along the foot section.

7. The stiffening element according to claim 6, wherein the minimum thickness along the foot section is between 0.1 mm and 0.2 mm.

8. The stiffening element according to claim 1, wherein the at least one layer of the glass-fiber-reinforced plastic has a minimum thickness of at least 0.1 mm along the foot section.

* * * * *